United States Patent [19]

Roessner et al.

[11] Patent Number: 5,727,654
[45] Date of Patent: Mar. 17, 1998

[54] CONVEYOR WITH A HEATER FOR FOOD AND BEVERAGE ITEMS IN AN AIRCRAFT

[75] Inventors: Bernd Roessner, Rosengarten; Wilfried Sprenger, Harsefeld-Issendorf; Hinnerk Kleinwort, Hamburg, all of Germany

[73] Assignee: Daimler-Benz Aerospace Airbus GmbH, Hamburg, Germany

[21] Appl. No.: 678,815

[22] Filed: Jul. 12, 1996

[30] Foreign Application Priority Data

Jul. 15, 1995 [DE] Germany .................. 195 25 878.9

[51] Int. Cl.⁶ ........................................ B64D 11/04
[52] U.S. Cl. ............... 186/40; 99/443 C; 186/50; 244/118.1; 198/952; 219/403
[58] Field of Search ............... 186/40, 50; 244/118.1; 198/340, 952; 221/150 A; 219/385, 386, 387, 388, 403, 621; 99/443 C, 448

[56] References Cited

U.S. PATENT DOCUMENTS

| 3,146,338 | 8/1964 | Seremak | 219/403 |
|---|---|---|---|
| 3,786,222 | 1/1974 | Harden et al. | 219/621 X |
| 4,384,191 | 5/1983 | Guibert | 219/400 |
| 4,757,184 | 7/1988 | Swanson et al. | 219/386 X |
| 5,011,042 | 4/1991 | Bunce et al. | 221/150 A |
| 5,496,000 | 3/1996 | Mueller | 244/118.1 |

*Primary Examiner*—F. J. Bartuska
*Attorney, Agent, or Firm*—W. G. Fasse; W. F. Fasse

[57] ABSTRACT

A conveyor system for transporting menu boxes (14) in an aircraft is equipped with at least one heater element (17) or groups of such elements (17/17A...) which tilt automatically into spaces (16) between neighboring boxes (14) or pairs of boxes within the conveyor which is stopped during heating. When the heating is completed the elements (17) are again tilted into a rest position (17') outside the conveyor. Induction heating is preferably used.

16 Claims, 3 Drawing Sheets

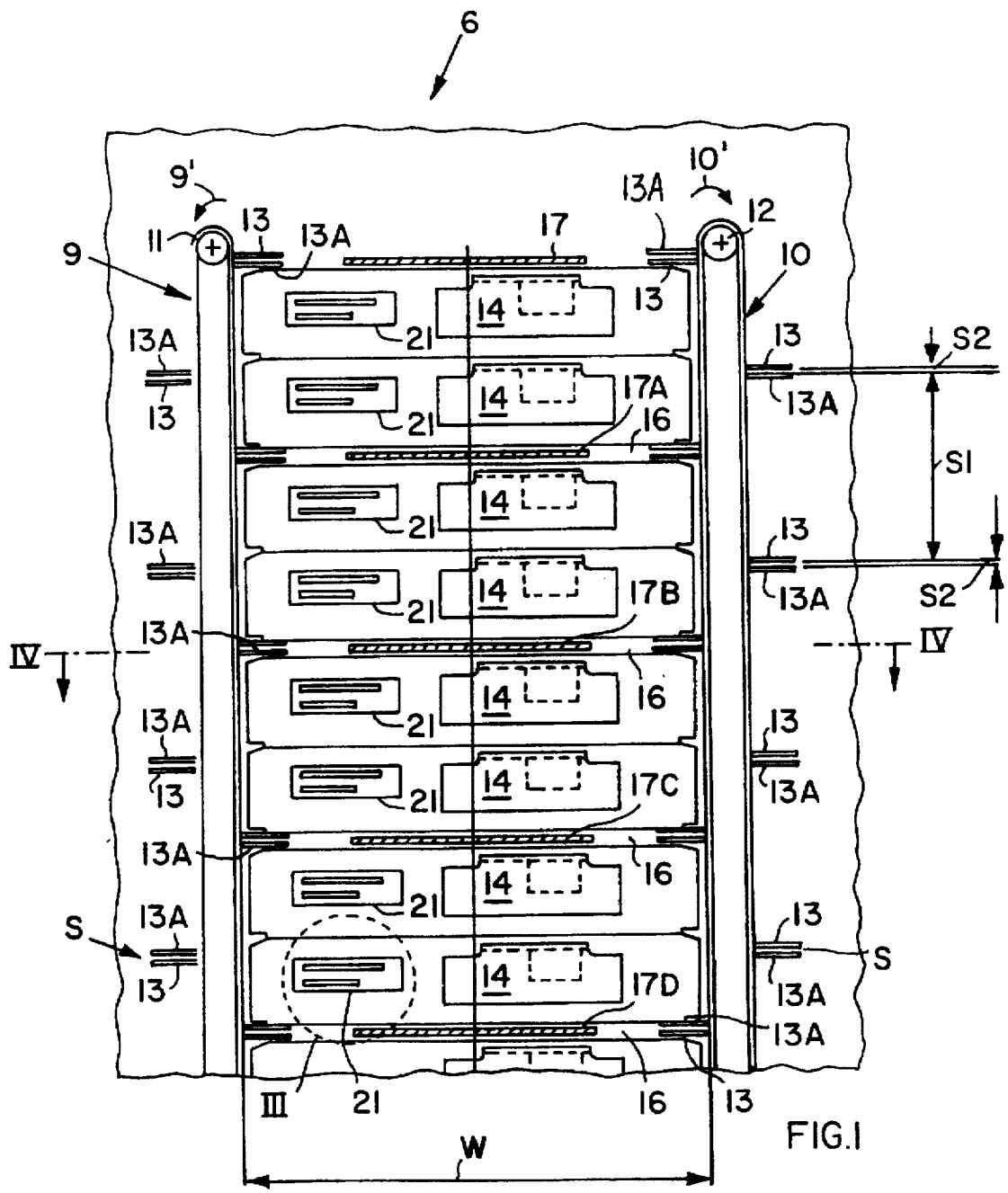
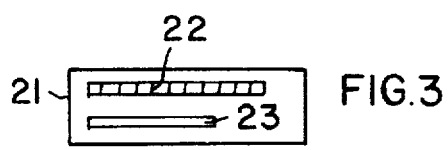
FIG.3

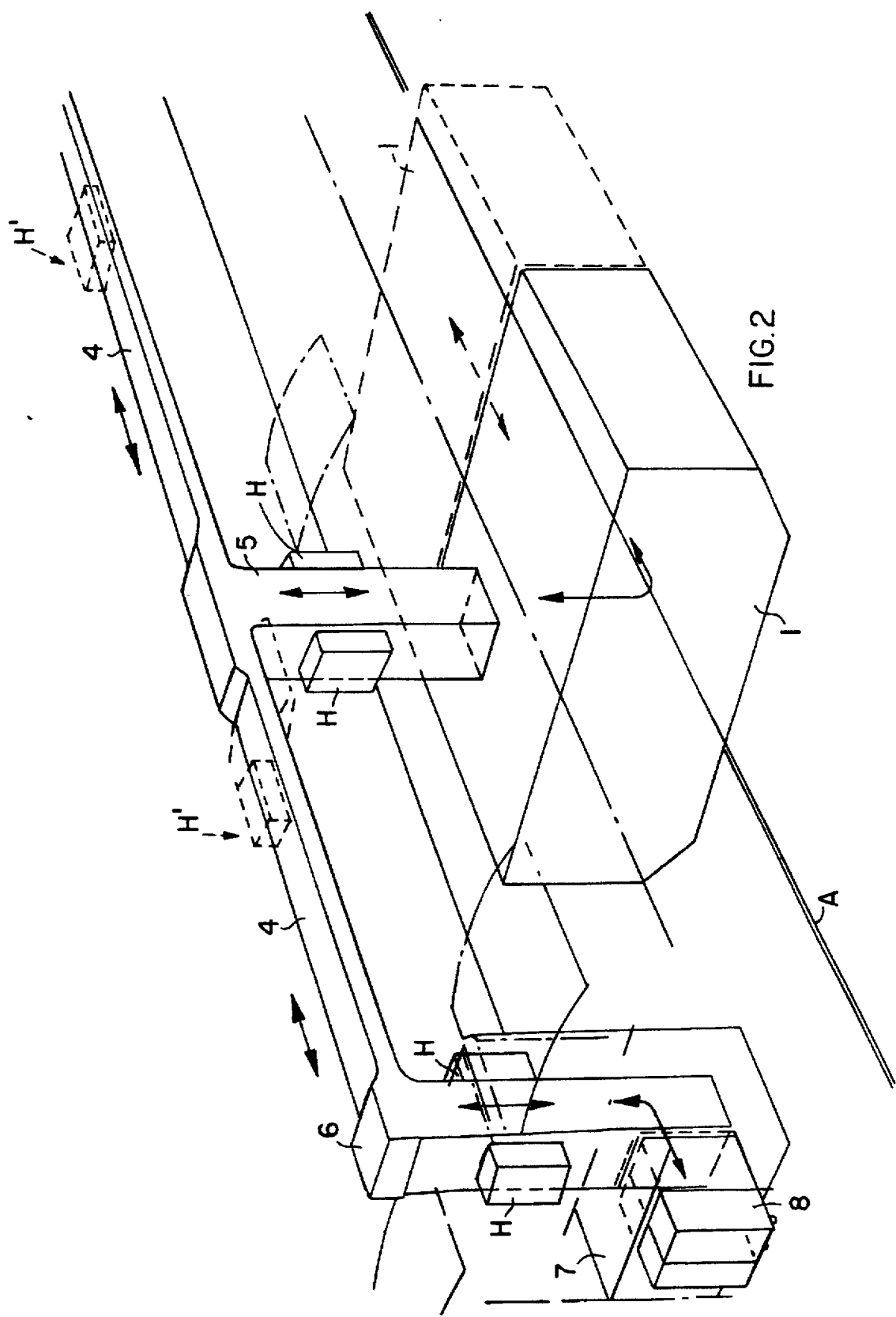

CONVEYOR WITH A HEATER FOR FOOD AND BEVERAGE ITEMS IN AN AIRCRAFT

FIELD OF THE INVENTION

The invention relates to a conveyor especially a vertical conveyor for transporting food and beverage items on-board an aircraft. Such a vertical conveyor has two belt systems rotating in opposite directions so that belt runs facing each other run in the same direction. Each belt system is equipped with separators acting as entraining elements for menu boxes. A single horizontal conveyor belt may also be used.

BACKGROUND INFORMATION

U.S. Pat. No. 5,496,000 (Mueller), issued Mar. 5, 1996, describes a system for storing and transporting food and beverages in menu boxes on-board of an aircraft. The disclosure of Mueller is incorporated herein by reference.

In the Mueller system, the food and beverages are not stored in so-called serving carts or trolleys. Rather, the food and beverages are stored in menu boxes which in turn are stored in a freight container of standardized dimensions. A box conveyor is positioned between the freight container and stations, such as a galley, in the aircraft where the menu boxes are distributed. An unloading mechanism takes the menu boxes out of the container and places them onto the conveyor which includes at least one vertical conveyor section. The vertical conveyor section comprises two vertically disposed conveyor belts rotating in opposite directions so that the two conveyor belt runs facing each other travel in the same direction. The conveyor belts are equipped with separators functioning as entraining elements for the boxes. The separators or entraining elements are secured to both conveyor belts so that the separators extend crosswise of and parallel to the plane of the conveyor belts substantially in the horizontal direction. A control unit assures the coordination of the individual transporting and transfer motions thereby permitting a substantially automated operation of the system.

If hot meals are to be served, the food is heated in separate heating cells. The content of a defined number of menu boxes can be heated simultaneously in a heating cell by any suitable heating device; e.g. a microwave source. A separate heating cell energy as an individual component of the system is a disadvantage because it requires its own space and adds its own weight to the aircraft weight, so that such a system leaves room for improvement with regard to an optimal solution of the problem of heating food for passengers and crew in an aircraft.

U.S. Pat. No. 5,496,000 (Mueller) also discloses a mechanism for removing menu boxes from the freight container on board the aircraft. Construction details of the boxes are also disclosed. These boxes are provided in different standardized sizes. One basic size relates to a relatively flat box while a second size provides a double box twice as large as the basic box. All equipment for handling these boxes is adapted to this standardized format or size. The flat box has the format of a conventional menu box, however, its construction is more rigid than conventional boxes and the end facing walls are provided with coupling elements for a proper line-up of these boxes. The double box is sized to correspond to two flat boxes, one of which rests on top of the other. Thus, a space in the freight container sufficient for a double box can take up two flat boxes. The double boxes are capable to hold bottles, drinking cups and the like. Prior to Mueller's system it was necessary to handle bottles, cans, and cups separately.

The above mentioned heating cells are arranged for example in the form of microwave ovens alongside the vertical conveyor section particularly on the main deck, thereby reducing the available space on the main deck. Each heating cell has a door and it is necessary to move the boxes out of the conveyor into the heating cells prior to use. Each heating cell can hold one menu box of standard or double standard size to heat the content inside the box to a suitable temperature within a relatively short time, such as two and one half minutes. However, the manual labor of placing the menu boxes from the conveyor into separate heating cells and retrieving the menu boxes again from the heating cells should be avoided.

U.S. Pat. No. 4,384,191 (Guibert), issued on May 17, 1983, and discloses a galley meal processing system on-board an aircraft for serving trays containing pre-cooked food to passengers. Food trays are placed into racks which in turn are placed into lockers that are heated, for example by circulating heated air through the locker. In the embodiment of FIG. 6 of Guibert the heat is introduced in spacings between stacks of menu boxes. Heated air is caused to travel through the spacings between stacks, Whereby the air passes through a controllable belt with holes therein which, as the belt travels through the spacings between the stack, register with holes in the side walls of the container holding the stacks so that hot air passes through the holes when they register and is interrupted when the holes do not register, thereby providing a pulsating airflow pattern. This heating system also requires its own space in the aircraft and it does not avoid the manual handling of the food trays for the heating purpose. Furthermore, the heat supply through preheated air is not very efficient.

OBJECTS OF THE INVENTION

In view of the above it is the aim of the invention to achieve the following objects singly or in combination:

- to construct a conveyor on which food boxes are being transported in such a way that food heating elements are substantially integrated into the conveyor system;
- to preferably heat the food containing boxes in a direct manner, for example by induction heating, dielectric heating, or microwave heating or the like;
- to control the heating in response to a sensor signal that provides information regarding the content of a menu box;
- to heat groups of menu boxes together while avoiding heating other menu boxes which, for example contain cold food; and
- to provide menu boxes with bar code labels to be read by a sensor or scanner to provide a control signal for the heating units.

SUMMARY OF THE INVENTION

According to the invention a conveyor for foodstuffs in menu boxes is equipped with a heating device in such a way that the heating device or heating elements of the heating device are tiltable into spaces between boxes on the conveyor into an operating condition and out of these spaces into a resting position. In a preferred embodiment a vertical conveyor carries the menu boxes with a spacing between neighboring boxes and the heating elements are tiltable by a respective drive about a vertical axis so that the heating elements move through a limited angular range in a horizontal plane from the resting position into the working position between neighboring menu boxes and back again when the required food temperature has been reached. In an arrangement with a horizontal conveyor the heating elements are tiltable about a horizontal axis and move through the respective angular range in a vertical plane rather than in a horizontal plane.

It is a special advantage of the invention that the foodstuffs are heated by heating elements that require little space and even disappear in their working position into the volume of the conveyor system while requiring little space next to the conveyor in a resting position. This construction minimizes the space requirement for the heating device and additionally provides weight reductions which are always advantageous in aircraft construction. It is no longer necessary to manually move the menu boxes into and out of a heater. Furthermore, it has been found that the quality of the food in these menu boxes is not adversely influenced by the heating employed according to the invention, particularly the inductive heating. The taste remains unaltered and the temperature of the food can be accurately controlled.

BRIEF DESCRIPTION OF THE DRAWINGS

In order that the invention may be clearly understood, it will now be described, by way of example, with reference to the accompanying drawings, wherein:

FIG. 1 is a vertical elevational view of a portion of a vertical conveyor equipped with a heating device according to the invention;

FIG. 2 is a partial perspective view of a conveyor system as disclosed in the above discussed Mueller patent, but improved with heating devices according to the invention;

FIG. 3 shows on an enlarged scale a label for a menu box as encircled at III in FIG. 1.

Figure 4:
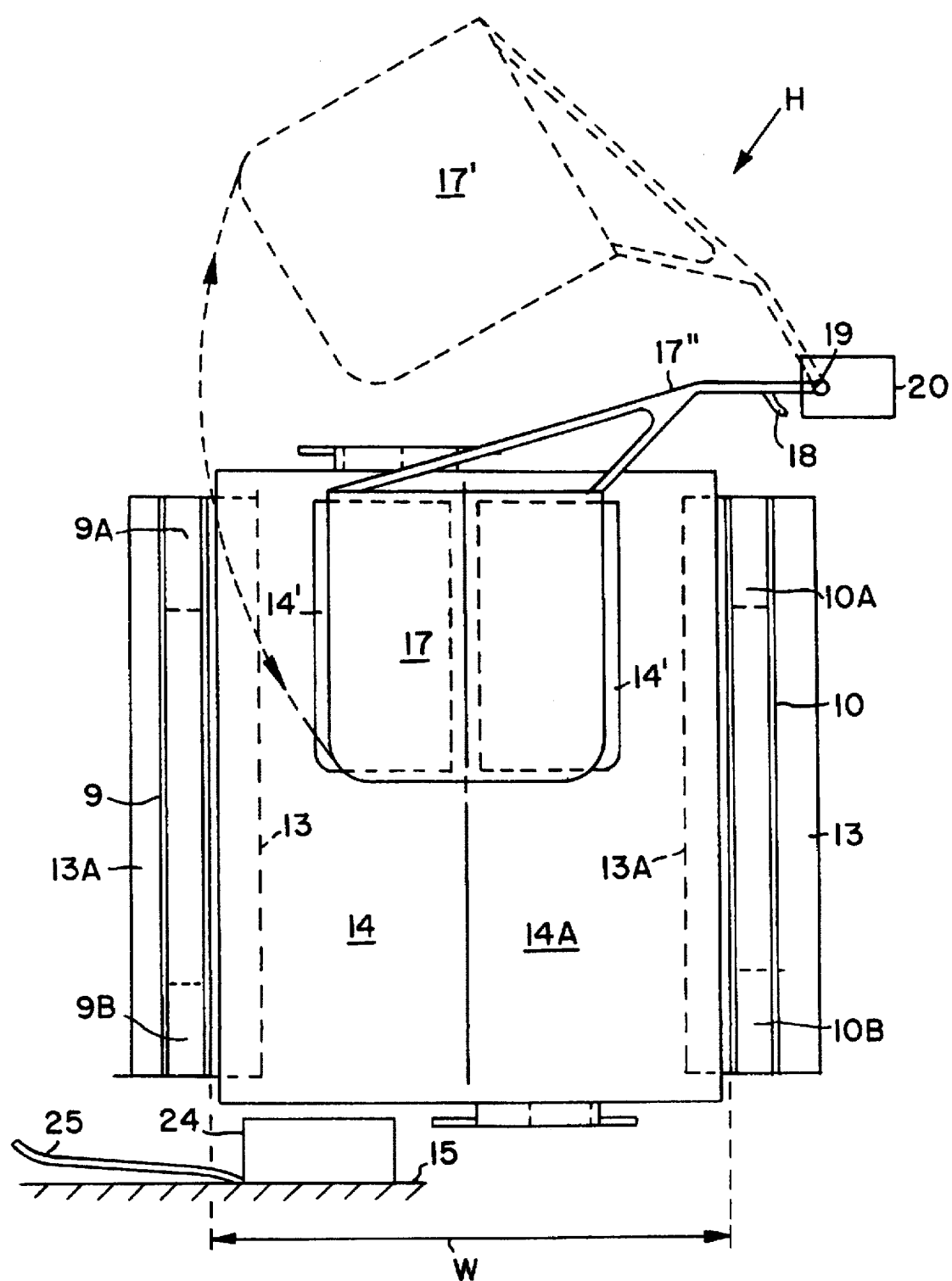
FIG. 4 is a plan view onto the sectional plane IV—IV in FIG. 3.

DETAILED DESCRIPTION OF PREFERRED EXAMPLE EMBODIMENTS AND OF THE BEST MODE OF THE INVENTION

Referring first to FIG. 2, the conveyor system of FIG. 3 of U.S. Pat. No. 5,496,000 (Mueller) is equipped according to the invention with heaters H cooperating with at least one vertical conveyor section 5, 6. While it is preferred that the present heaters cooperate with vertical conveyor sections, it is possible to arrange heaters H' for cooperation with horizontal conveyor sections 4 as shown by dashed lines.

Menu boxes 14 with information labels shown in FIGS. 1 and 3 are initially loaded into the cargo hold of an aircraft A in standardized freight containers 1. The aircraft body may comprise one or more passenger decks. The conveyor system 4, 5, 6 transports the menu boxes 14 out of the containers 1 through the vertical sections 5, 6 and along the horizontal sections 4 to a distribution station 7, such as a galley. In operation, a transfer feeder withdraws the boxes from the containers 1 in accordance with a program control to transport these boxes in the vertical conveyor section 5 and further through the horizontal feeder section 4 to the distribution station 7 where the menu boxes may be placed directly into service trolleys or carts 8 because the food requiring heating has been heated before it reaches station 7. Further details of the conveyor system as such are described in the above mentioned Mueller patent.

FIG. 1 shows schematically for example the upper end of the vertical conveyor section 6. According to the invention, each of two endless belt systems with conveyor belts 9 and 10 is equipped with separators S acting as entraining elements 13 and 13A for menu boxes 14 and also for spacing neighboring menu boxes from each other to provide spacings 16. The conveyor belt 10 rotates clockwise as indicated by the arrow 10' about a drive and/or guide roller 12. The conveyor belt 9 rotates counterclockwise as indicated by the arrow 9' about a drive and/or guide roller 11. The rollers 11 and 12 are driven in synchronism with each other and are stopped for the heating. As a result, the inwardly facing runs of these conveyor belts 9 and 10 travel in the same direction, namely upwardly. The lower drive and/or guide rollers for the belts 9 and 10 are not shown.

The above mentioned separators S of the invention are rigidly connected to the conveyor belts 9 and 10 and extend substantially horizontally and parallel to the plane of the respective belt 9, 10. The separators S are arranged in pairs functioning as entraining and spacer elements 13, 13A. The separators provide two different spacings S1 and S2 measured in the travel direction of the belts 9 and 10. A larger spacing S1 is defined between two neighboring pairs of separators. The spacing S2 is defined between two separator elements 13 and 13A of the same pair. The spacings S1 are all of the same size and define compartments between the two conveyor belts 9 and 10 to hold menu boxes 14. Preferably, the spacing S1 is sufficient to form compartments for holding at least two standard menu boxes 14 or one double box as best seen in FIG. 1. Between the conveyor belts the spacers on one conveyor belt face the same spacers on the other conveyor belt in a horizontal plane to form the just mentioned compartment for the boxes 14. The second spacing S2 is just sufficient to space the boxes 14 sufficiently from each other to form the spacing 16 for the entry of a heating element 17 into the just mentioned spacings 16.

Referring to FIGS. 1 and 4, the inwardly facing runs of the belts 9 and 10 are spaced from each other by a width W corresponding to two box widths or a box length. The width W will be selected with due regard to the box dimensions and to the desired box orientation in the conveyor. The spacing S2 between the separators 13 and 13A of a pair makes sure that the respective spacing 16 is provided between neighboring boxes in the conveyor.

Referring to FIG. 4 the vertical conveyor systems may each comprise only a single belt 9, 10 with a width corresponding substantially to the length of the boxes 14. However, the same effect can be achieved by using two endless belts 9A and 9B in one system and 10A and 10B in the other system whereby the outer edges of belts 9A and 9B are spaced from each to correspond substantially to the box length. The same applies to the outer belt edges 10A and 10B. In order to assure that the belts of both conveyor systems run in synchronism with each other to always align the separators in the same horizontal plane, it is preferred that the belts are constructed as gear belts and that the rollers 11 and 12 are provided with respective teeth for meshing with the inwardly facing gear teeth of the respective belts.

As shown in FIG. 1, a plurality of heating elements 17, 17A . . . 17D are provided according to the invention for heating the menu boxes or at least portions of the menu boxes 14 and thus the food in these menu boxes. As mentioned, the vertical conveyor 6 is equipped with at least one heater H or with two heaters as shown in FIG. 2. Each heater is preferably provided with a group of heating elements 17, 17A . . . 17D whereby the group of heating elements is driven in unison by a drive 20 such as an electric motor provided in common for all heating elements of a group. The heating elements may preferably comprise inductive heating coils not shown but flat enough to fit the respective heating element into the spacing 16 between neighboring menu boxes 14.

Conventional serving carts on-board an aircraft are normally equipped to hold fourteen flat menu boxes 14. Hence, it is efficient to assemble seven heating elements 17 in a group or packet which is sufficient for the heating of fourteen boxes while requiring an optimally small space. Thus, a single group of seven heating elements can heat the entire content of one serving cart. FIG. 1 shows only five heating elements or inductors 17, 17A ... in a position tilted into the spacings 16. Each heating element emits during operation in the active heating position a high frequency magnetic field for heating the content of the menu boxes 14 by high frequency induction. For this purpose each menu box is equipped with at least one plate-shaped 25 electrical conductor which is positioned in that area of each box 14 holding food to be heated. This heating plate is heated by the magnetic induction field and thus becomes a heat source for heating the food. By dimensioning and/or configuring the heating plates in the boxes to just the area where the food to be heated is located, a very efficient heating arrangement is achieved according to the invention. Since the heating takes a few minutes it is preferred that simultaneously the number of menu boxes being heated is as large as possible. During the heating the conveyor is stopped to permit the heating elements 17 ... to be moved into the spacings 16 until the heating is completed. The heated boxes 14 are directly supplied into the respective serving carts or trolleys. The just described heating of large numbers of boxes is accomplished by preferably using several groups of heating elements or inductors 17 simultaneously. The arrangement is preferably such that the total number of heating elements corresponds to a multiple of seven, whereby each group of seven heating elements can heat fourteen boxes or rather defined portions of fourteen boxes.

In a further embodiment of the invention the heating system encompasses several rotatable or tiltable packages of heating elements or inductors 17.

Since the vertical conveyor section 6 is part of a larger system that is controlled by a program, the heating process which takes place within the vertical conveyor can proceed automatically. For this purpose the vertical conveyor section 6 is equipped with at least one sensor device 24 which reads data from carriers such as labels 21 which contain information regarding the contents of the menu boxes in machine readable form, e.g. bar codes which are arranged on the menu boxes 14 to be readable by the sensor 24. In a preferred embodiment the sensor device 24 is an optical bar code scanner of known type so that simple adhesive labels with corresponding black/white fields can be used as bar code data carriers. In the example of the embodiment shown the menu boxes 14 are thus equipped with adhesive information bearing labels 21.

FIG. 3 shows details of the adhesive label 21 according to FIG. 2. The label 21 shows a first text field 22 for information in clear text and a second text field 23 for accepting bar coded information whereby the information in clear text is rather helpful for the manual handling of the menu boxes. The bar code may also provide content information for each individual menu box 14 detectable by the sensor device 24 for controlling the heating duration and/or the heating energy fed to the individual heating elements or inductors 17 ... under the control of a program in accordance with the contents of the corresponding menu boxes 14. Instead of bar codes other types of data carriers may be used, such as magnetic patterns providing the information. Due to the sensor device 24 it can be assured for example, that menu boxes 14 that contain only cold food are not heated. Furthermore, the sensor device 24 makes it possible to track certain menu boxes within the system by a program when several sensor devices 24 are arranged in the complete system and to guide these certain menu boxes to a certain output unit or station 7.

FIG. 4 shows a plan view toward the section plane IV—IV according to FIG. 2. The section plane IV—IV cuts through one of the spacings 16 just above the corresponding heating element or inductor 17. In addition to the belts 9 and 10 the view of FIG. 4 shows the heating element or inductor 17 in its tilted, full-line, active heating position whereby it covers a portion of the corresponding menu box 14 or a portion of each of two boxes 14, 14A extending in parallel to each other. A motor 20 is provided to execute the tilting movements about the common vertical axis 19 to which all elements 17 are rigidly connected. Due to the dimensions or due to the configuration of the heating element or inductor 17 it is assured that only that portion of the food is heated that is actually supposed to be heated. When putting the food in the menu boxes 14 care is taken to make sure that the specific portion of the food that is to be heated is arranged within the reach of the heating element or inductor 17. The element or inductor 17 is shown by dashed lines in its rest position 17' in which it is not energized.

The element 17 is energized by a current flowing through a flexible electric power supply line 18 for the high frequency energy. The line 18 passes in an insulated manner through an arm 17" that rigidly connects the respective heating element 17 to the drive shaft 19 driven by a drive 20 such as an electric motor. If the contents of the menu boxes found in the vertical conveyor are now to be heated, the belt systems are stopped as mentioned after completing the corresponding transport operation. The corresponding menu boxes 14 have then achieved positions in which the spacings 16 are in the horizontal planes in which the elements 17 are tilted between the full line position and the dashed line position 17'. Then the heating elements or inductors 17 are tilted into the spaces 16 and the heating process of the foodstuffs contained in the menu boxes 14 is started by switching on a high frequency energy source not shown but connected to the elements 17 through supply line 18. After the heating process is completed the heating elements or inductors 17 are tilted out again to their resting position 17' and switched off and the boxes with the now heated food therein are transported to waiting service trolleys or carts 8.

FIG. 4 shows the above mentioned bar code scanner or sensor 24 which may be fixed to the housing 15 of the vertical conveyor 6. A data line 25 serves to connect the output of the bar code scanner 24 to a central processing unit (not shown) of the complete system.

FIG. 4 also shows schematically that each menu box 14 is equipped with a heating plate 14' for generating eddy currents therein which cause the heating in the box volume portion below the respective heating plate 14'. The size and/or configuration of these plates 14' is preferably approximately commensurate to the heating area of the respective element 17.

Although the invention has been described with reference to specific example embodiments, it will be appreciated that it is intended to cover all modifications and equivalents within the scope of the appended claims.

What is claimed is:

1. A conveyor for transporting food and beverage items in boxes (14) in an aircraft comprising at least one conveyor belt (6) for transporting said boxes (14) from a storage position in the aircraft to a use-position in the aircraft, said at least one conveyor belt comprising separators (S) thereon providing spacings (16) between neighboring boxes transported by said conveyor, at least one heater device positioned next to said conveyor (6), said heater device comprising at least one heater element (17, 17A...) fitting into said spacings (16), and a drive (20) connected to said heater element (17) for moving said heater element into an active heating position inside one of said spacings and into an inactive position outside said spacings.

2. The conveyor of claim 1, comprising two vertically movable conveyor belts (9,10) each provided with said separators (S) forming compartments for said boxes (14) and said spacings (16) for said heater element (17) and wherein said drive (20) comprises a vertically extending drive shaft (19) to which said heater element or elements (17) are rigidly secured for horizontally tilting said heater element (17) into and out of said spacing (16).

3. The conveyor of claim 1, wherein said heater element comprises an induction coil for heating at least a portion of a content in said boxes.

4. The conveyor of claim 1, wherein said induction coil in said active heating position covers only a portion (14') of said box (14).

5. The conveyor of claim 1, wherein said heater device comprises a plurality of heating elements (17, 17A, 17B ...), and wherein said heating elements are spaced from each other along said conveyor for movement into and out of said spacings (16) between neighboring boxes (14).

6. The conveyor of claim 5, wherein each of said plurality of heating elements comprises an inductive heating coil.

7. The conveyor of claim 5, further comprising a common drive shaft (19) connecting all heating elements of a group of heating elements to said drive (20) whereby said drive operates all heating elements in unison or synchronism.

8. The conveyor of claim 1, comprising a plurality of heating elements arranged in at least two groups of heating elements and a separate drive for tilting each group of heating elements.

9. The conveyor of claim 1, comprising at least one sensor (24) for sensing a data carrier (21) on said boxes (14) to provide a control signal for said drive (20) in response to a box content sensed from said data carrier (21).

10. The conveyor of claim 9, wherein said sensor (24) is an optical bar-code sensor.

11. The conveyor of claim 2, wherein each of said conveyor belt systems comprises two endless belts (9A, 9B; 10A, 10B) forming two pairs of vertically disposed belts, said separators being secured to each pair of belts at distances (S1, S2) to form said box compartments and said spacings (16).

12. The conveyor of claim 2, wherein each of said conveyor belt systems comprises one endless conveyor belt (9, 10) having a width corresponding substantially to a box dimension.

13. The conveyor of claim 2, wherein said separators (S) are arranged so that two closely spaced separators form a narrow spacing (S2) and so that two separators with a wider spacing (S1) therebetween form said compartments.

14. The conveyor of claim 7, wherein said conveyor is a vertical conveyor, and wherein one of said two groups of heating elements is arranged on one side of said vertical conveyor and the other group of heating elements is arranged on an opposite side of said vertical conveyor.

15. The conveyor of claim 1, wherein said boxes (14) comprise identification labels (21).

16. The conveyor of claim 1, wherein said boxes (14) comprise heating plates (14').

* * * * *